Figure 1:
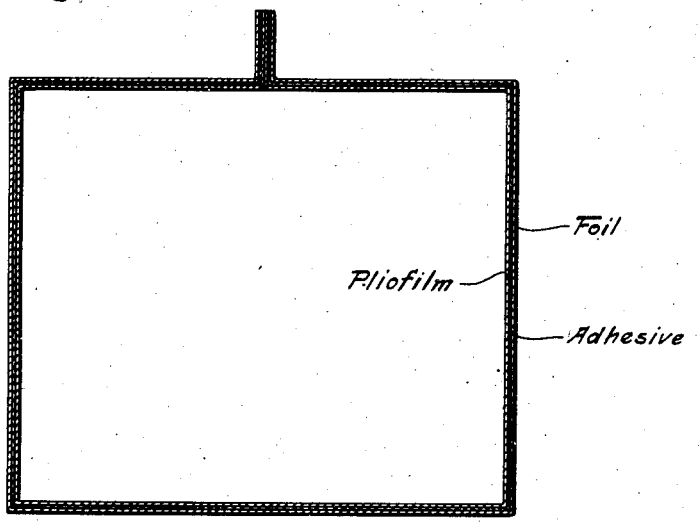

May 14, 1946.　　　A. B. CLUNAN　　　2,400,390

PACKAGE

Filed July 30, 1941

Inventor

Albert B. Clunan

By

Attorney

Patented May 14, 1946

2,400,390

UNITED STATES PATENT OFFICE 2,400,390

PACKAGE

Albert B. Clunan, Akron, Ohio, assignor to Wingfoot Corporation, Akron, Ohio, a corporation of Delaware Application July 30, 1941, Serial No. 404,650

1 Claim. (Cl. 206—46)

This invention relates to a new and improved vacuum package for coffee, cheese, meat and other foodstuffs and materials which it is desirable to package in a vacuum. The package comprises a ply of a metal foil, such as a foil of tin or aluminum or other metal and a ply of rubber hydrochloride film, such as Pliofilm. The foil and Pliofilm may be united directly together, or they may be united by an adhesive, or they may be both united to some third material such as, for example, a ply of paper.

It has long been recognized that metal foils are highly resistant to moisture, and they have commonly been used for packaging tobacco and other materials which it is desired to keep at a uniformly high or low moisture content. However, the foils alone are quite fragile and they are not impervious. They could not be used alone for a vacuum package.

A film, such as Pliofilm, is known to be highly moisture resistant. However, pin holes occur in Pliofilm so that by itself it is not satisfactory for vacuum packaging.

By combining Pliofilm with tin foil the advantages of both materials are obtained, and the disadvantages of each alone are overcome. For example, the Pliofilm is not at all fragile, and it prevents the foil from breaking on crumbling or flexing. Although each ply is pervious to some extent, the holes are very small and scattered and quite infrequent, and by laminating the film to the foil the holes in each are covered. It is generally appreciated that Pliofilm becomes brittle on exposure to sunlight; by covering the Pliofilm with the foil and forming the package with the foil on the outside the foil protects the Pliofilm from the light. Another advantage lies in the fact that Pliofilm being heat-sealable, a heat-sealable package is formed if the package is made with the Pliofilm on the inside and the foil on the outside. The Pliofilm is resistant to most materials, odorless and tasteless, and, therefore, makes a superior lining for a package.

Various adhesives now on the market can be used for uniting the film to the foil. Latex adhesives and adhesives of cyclized rubber are suitable for this purpose.

Where a heavier packaging material is desired a third ply may be interwoven between the foil and the film. For an inexpensive package a ply of paper may be used. Cloth, of course, may be employed where high tensile strength is required. The foil and film are separately united to the third ply by a suitable adhesive. Instead of using an adhesive the Pliofilm may be united to the foil or other material by heat and high pressure.

Various methods of forming vacuum packages have been suggested. The package may be filled with the foodstuff or other material which is to be packaged, and then the package may be evacuated; or the package may be evacuated and then filled while maintained under a vacuum.

It has been proposed that vacuum packages be sealed under ordinary pressure and then be opened and evacuated and the vacuum maintained by a suitable valve arrangement. This, of course, may be done if desired.

According to a preferred procedure the package is made of a flat bag of the envelop type, such as a bag made by folding a rectangular sheet of the packaging material double and then uniting the two edges of the sheet on each side adjacent the fold. This gives an envelop closed on three sides and open on the fourth. After filling the fourth side may be sealed. All of these seals are flat seals and may, therefore, be made tight, and this is, therefore, a preferred form of package. It may be desirable to block the bag out so that it assumes the form of a hexahedron before filling.

A convenient method of operation is to fill the bag and then introduce it into a vacuum chamber and after evacuating, bring the two lips of the open side of the bag together in flat, straight-line contact and seal them in this position. If the ply of Pliofilm is exposed on the interior of the bag the surface of the lips which are brought together are rubber hydrochloride, and the seal at the mouth may be easily formed by heat and pressure. The side seams of such a bag may likewise be made by heat-sealing.

Figure 2:
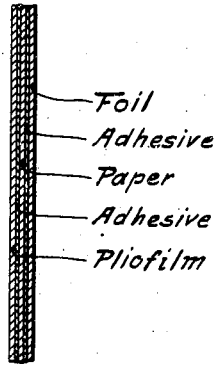

In the drawing:

Fig. 1 is a section through such a package;

Fig. 2 is a detail showing a different type of packaging material. The section shows foil on the outside of the package and Pliofilm on the inside. The package is sealed at the top by a heat-seal between the two plies of Pliofilm.

The Pliofilm and foil of Fig. 1 are united by a layer of adhesive. Instead of uniting them directly they may both be united to a ply of paper as shown in Fig. 2.

Such a package may be used for packaging ground coffee or for Swiss cheese or American cheese or a grated cheese or for mayonnaise or for a great variety of foodstuffs, which when packaged in vacuum maintain their freshness.

Such a vacuum package need not be maintained under an absolute vacuum, but a higher or lower vacuum may be used.

What I claim is:

An airtight, vacuum package which contains, in addition to the material packaged therein, evacuated space which tends continually to draw air through the walls of the package, the walls of the package being flexible and composed of a laminated sheet which is a metal foil on the exterior and rubber hydrochloride film on the interior, the seams of the package being formed by coalescence of contacting rubber hydrochloride surfaces.

ALBERT B. CLUNAN.